United States Patent
De Palma

(10) Patent No.: US 9,789,918 B2
(45) Date of Patent: Oct. 17, 2017

(54) AUTOMATIC TENSIONING SYSTEM OF TRACKS OF A PAVER FINISHER

(75) Inventor: Domingo De Palma, Alfonsine (IT)

(73) Assignee: Marini S.p.A. (IT)

(*) Notice: Subject to any disclaimer, the term of this patent is extended or adjusted under 35 U.S.C. 154(b) by 750 days.

(21) Appl. No.: 14/006,921

(22) PCT Filed: Mar. 19, 2012

(86) PCT No.: PCT/EP2012/001206
§ 371 (c)(1),
(2), (4) Date: Nov. 27, 2013

(87) PCT Pub. No.: WO2012/126606
PCT Pub. Date: Sep. 27, 2012

(65) Prior Publication Data
US 2014/0070604 A1   Mar. 13, 2014

(30) Foreign Application Priority Data

Mar. 21, 2011   (IT) .............................. UD2011A0041

(51) Int. Cl.
*B62D 55/30* (2006.01)
*B62D 55/06* (2006.01)

(52) U.S. Cl.
CPC ........... *B62D 55/30* (2013.01); *B62D 55/062* (2013.01); *B62D 55/305* (2013.01)

(58) Field of Classification Search
CPC ...... B62D 55/30; B62D 55/06; B62D 55/305; B62D 55/14

(Continued)

(56) References Cited

U.S. PATENT DOCUMENTS

| 1,674,133 A | * | 6/1928 | Festary | .................. | B62D 55/22 |
| | | | | | 305/49 |
| 3,429,242 A | * | 2/1969 | Mori | ...................... | G03B 7/083 |
| | | | | | 396/254 |

(Continued)

FOREIGN PATENT DOCUMENTS

| DE | 3246208 A1 | * | 6/1984 |
| JP | S5853576 A | | 3/1983 |
| JP | 2005306307 A | | 11/2005 |

OTHER PUBLICATIONS

International Preliminary Report on Patentability Application No. PCT/EP2012/001206 dated Apr. 8, 2013 28 pages.

(Continued)

*Primary Examiner* — S. Joseph Morano
*Assistant Examiner* — Jean Charleston
(74) *Attorney, Agent, or Firm* — St. Onge Steward Johnston & Reens, LLC

(57) ABSTRACT

A tensioning system of traction tracks of a machinery by means of a hydraulic cylinder applying a tensioning force on at least one of the wheels on which the track is wound according to a closed chain configuration in which the hydraulic cylinder is fed with different pressures according to the traction direction, in a first traction direction the feeding pressure of the tensioning hydraulic cylinder being a first pressure approximately corresponding to the pressure which is generated by a pump which is present on a closed circuit feeding the traction devices, in a second traction direction the feeding pressure of the tensioning hydraulic cylinder being a second pressure corresponding to the pressure of the closed circuit up to a predetermined upper limit value.

16 Claims, 5 Drawing Sheets

(58) Field of Classification Search
USPC .................................. 305/143, 144, 145, 149
See application file for complete search history.

(56) References Cited

U.S. PATENT DOCUMENTS

| | | | | |
|---|---|---|---|---|
| 3,724,580 A * | 4/1973 | Adams, Jr. | ................ | B60P 3/42 180/9.21 |
| 3,910,649 A * | 10/1975 | Roskaft | ................ | B62D 55/30 180/9.1 |
| 4,279,318 A * | 7/1981 | Meisel, Jr. | ........... | B62D 55/305 180/9.64 |
| 5,005,920 A * | 4/1991 | Kinsinger | .............. | B62D 55/30 305/146 |
| 5,240,084 A * | 8/1993 | Christianson | ...... | B62D 49/0635 180/9.1 |
| 5,984,436 A * | 11/1999 | Hall | ...................... | B62D 55/30 305/143 |
| 6,929,334 B2 * | 8/2005 | Verheye | ................ | A01D 41/02 137/255 |
| 7,914,087 B2 * | 3/2011 | Alfthan | ................ | B62D 55/305 305/125 |
| 2006/0097571 A1 * | 5/2006 | Fornes | .................. | B62D 55/32 305/145 |
| 2009/0072617 A1 * | 3/2009 | Alfthan | ................ | B62D 55/305 305/146 |
| 2009/0289496 A1 * | 11/2009 | Dietrich | ................ | B62D 55/30 305/147 |
| 2011/0155482 A1 * | 6/2011 | Courtemanche | ....... | B62D 55/07 180/9.1 |

OTHER PUBLICATIONS

International Search Report & Written Opinion of the International Searching Authority Application No. PCT/EP2012/001206 dated Jun. 22, 2012; dated Jul. 2, 2012 8 pages.

* cited by examiner

AUTOMATIC TENSIONING SYSTEM OF TRACKS OF A PAVER FINISHER

FIELD OF THE INVENTION

The present invention relates to a system intended to obtain the right track tensioning of a paver finisher, in the advancing direction and in the reverse direction.

BACKGROUND OF THE INVENTION

Definitions

Through the present description and in the appended claims the following terms must be intended according to the following definitions.

Through the present description the term "advancing direction" is referred to the moving direction or working motion direction (48) which is used for laying the material: the machine is also provided with "reverse direction", with the same characteristics of the "advancing direction" for the usual operation relative to transferring and maneuvering, reverse direction being intended as being referred to a driving way or motion direction which are opposite with respect to the one defined by the advancing direction.

The terms "right" and "left" are intended as referred to the machine with respect to the advancing direction or motion direction corresponding to the direction defined from the advancing direction.

Prior Art

The application field is the one which is relative to the laying of road surfacing by means of machines which are known in the field jargon as "finishers", or vibratory finishers, or paver finishers, etc.

These machines consist of two main units:
 a self-propelled tractor on wheels or on tracks, generally operated by a diesel engine,
 a material screed unit, towed by the tractor itself.
The tractor's diesel engine operates a series of hydraulic pumps that supply different dedicated circuits:
 for the machine advancing,
 for the screed material controlled feeding
 for the screed unit operation and control.

When a screed width greater than the base unit width is required, some extensions at the ends of the screed itself are applied until the required width is reached. Said extensions are generally available with different widths and they can be used in more sectors until the limit determined by the unit maker is reached.

In the case of a self-propelled tractor on tracks each track essentially consists of a closed chain with earthing support shoes which is moved by a driving toothed wheel and which slides on a corresponding driven wheel. For a correct transmission of the motion the good engagement of the chain on the toothed wheel must be ensured and the derailment of the chain from the driven wheel must also be prevented. This is obtained keeping the chain in a tensioned condition applying a force to the driven wheel in a direction which is an approximately parallel direction with reference to the line connecting the centers of the driving toothed wheel and of the driven wheel. The tensioning system of the chain is generally obtained mounting the driven wheel on a slide which is longitudinally movable with respect to the line connecting the centers of the driving crown and of the driven wheel. On the slide a pushing group acts, which generally consists of a spring which is preloaded by a screw system, or as an alternative it consists of a spring which is preloaded by a cylinder with pressurized grease, or as an alternative it consists of a spring which is preloaded by an hydraulic cylinder, or simply it consists of a hydraulic cylinder.

DE3246208 discloses a vehicle lying on tracks having a hydraulic tensioning device for the tracks containing a valve arrangement which maintains the hydraulic pressure in the tensioning cylinder between a lower pre-tensioning pressure and an admissible pressure value which is greater than the pre-tensioning pressure by a fixed value during the advancing motion. However, during the reverse motion the admissible pressure is respectively greater than the pressure which is induced by the inversion control by a fixed value; for this purpose, the signal generated by a pressure signal generator connected during reverse motion to the pressure line of the hydraulic motor is amplified as a function of the respective expulsion volume of the hydraulic motor and it is supplied to the control part of the pressure limiting valve.

JP58053576 discloses a system to prevent the coming-off of a track or the like from a structure by means of interposing a booster which adjusts the tension of a track, in order to increase the force to push an idler roller during the reverse motion, situation in which a high hydraulic pressure is provided in a pipe which is transmitted to a large cylindrical chamber of the supercharger in order to push a piston with grease immission from a small cylindrical chamber of the booster through a conduit to a chamber of a cylinder, resulting in a pushing action of a cup which compresses a spring. As a result, a large pushing force is applied through a piston and a bar to the idle roller in order to increase the tension of the track.

JP2005306307 discloses a vehicle wherein a booster for adjusting crawler tension is installed separately from a cylinder device without changing the frame structure. A lower part traveling body is provided with a hollow column for turning installed with an upper part turning body at the center part of a main body frame. Track frames are provided on both left and right sides of the main body frame. A sprocket is provided to be rotated and driven at one end of each truck frame. An idler is provided to be movable and rotatable in the longitudinal direction at the other end of each truck frame. An endless crawler is wrapped around each sprocket and each idler. A cylinder device for energizing each idler in an projecting direction by compressible fluid pressure to impart tension to each crawler is installed in each truck frame. The booster for adjusting the crawler tension by outputting hydraulic pressure boosted from input pressure to each cylinder device is installed in the column for turning.

Problems of the Prior Art

With reference to the tensioning system with a hydraulic cylinder it must be underlined that the oil supply pressure to the cylinder is conditioned by the section of the cylinder itself and it must be opportunely adjusted in order not to generate an excessive force, which would cause:
 a useless power tacking from the diesel engine,
 the excessive wearing of the bushes of the chain link,
 the excessive wearing of the tooth of the driving crown,
 the excessive wearing of the surface of the driven wheel.

It must be considered that during the reverse motion the slackness of the lower arm of the chain can cause the tendency for a pair of links to stack immediately in front of the driving crown. To prevent this disadvantage the tensioning system, particularly in the case of long tracks, must generally apply a force, which is greater than the one, which is needed during the advancing motion. To obtain this result the tensioning cylinder is operated with a relatively high pressure to ensure the good operation of the tracks also in the reverse motion, or the tensioning cylinder id fed by a low-pressure line for the advancing motion and by an higher pressure line in the reverse motion.

The operating pressures are obtained by means of a connection to a supply line having a higher pressure with respect to the ones which are needed, which is generally connected to a pump in an open circuit at a low pressure (typically a gear pump, which is used for other services), with ramifications served by adjustable pressure reducing valves.

The prior art systems are complex and include a lot of devices, which cause the reliable operation to be problematic, breakings and failures being possible on a greater number of components.

Furthermore the prior art systems do not optimize in an efficient way the use of the power in the working conditions during the advancement motion or reverse motion.

SUMMARY OF THE INVENTION

The aim of the invention is to simplify the known tensioning systems of the tracks with hydraulic cylinders.

A further aim of the present invention is to optimize the pressure value of the oil supplying the cylinder, both in the advancing motion and in the reverse motion, limiting the power withdrawing during the working phase and obtaining a power withdrawing which is proportional to the strain during the reverse motion.

A further aim of the present invention is to optimize the number of the components, which are needed to make the system.

Concept of the Invention

The aim is reached with the characteristics of the main claim. The sub-claims represent advantageous solutions.

Advantageous Effects of the Invention

The solution in accordance with the present invention, by the considerable creative contribution whose effect constitutes an immediate and not-negligible technical progress, presents various advantages both from the point of view of the cost of the embodiment, and from the point of view of the power tacking from the diesel engine depending to the driving direction of the machine.

BRIEF DESCRIPTION OF THE DRAWINGS

It is hereinafter described a solution obtained with reference to the included drawings to be considered as a non-limiting example of the present invention in which.

DETAILED DESCRIPTION OF THE INVENTION

Figures schematically represent the configuration of a paver finisher with tractor and screed of relative details, as it is explained in the following.

Figure 1:
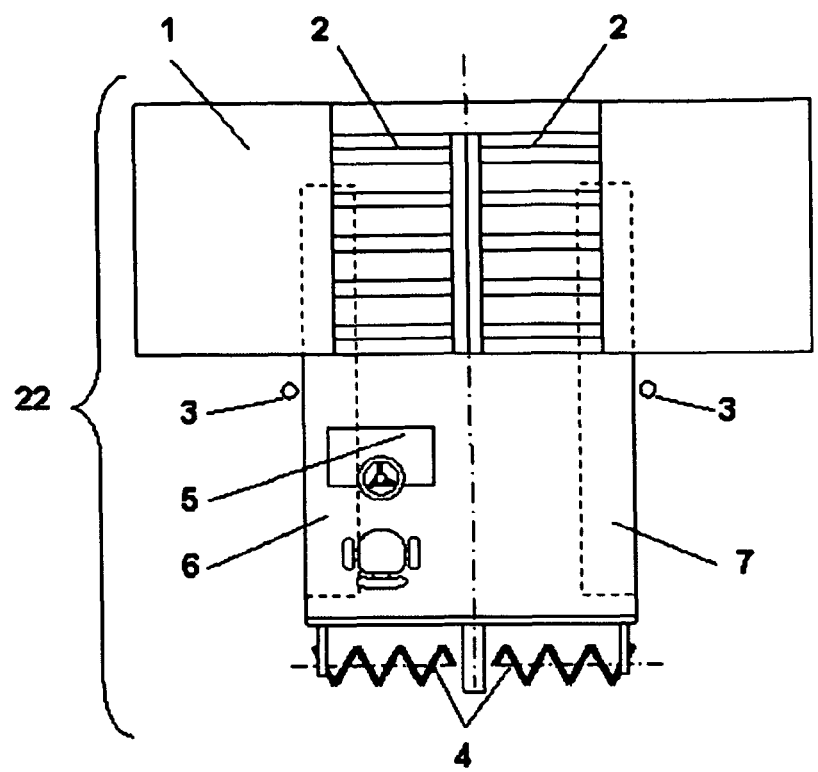
FIG. 1 schematically shows a tractor on tracks according to a plan view.

FIG. 1 schematically shows a tractor (22) on tracks according to a plan view and it includes:
- a hopper (1) for the collection of the material to be spread: typically bituminous conglomerate, case-hardened aggregate, stabilized inert materials. Such materials are discharged in the collection hopper from specially equipped transport means, typically trucks with overturnable platform, or from auxiliary means, typically front loaders, dumpers and the like. Advantageously the collection hopper is provided with overturnable sidewalls that, in the opened position, allow the easy discharge of the material from the transport means and in the closed position allow the machine to fall within the size allowed for its road haulage;
- one or two conveyors-extractors (2) of the material from the collection hopper to the rear part of the tractor;
- two towing points (3) of the screed unit (23), opportunely adjustable in height to allow different laying thicknesses;
- a material delivering cochlea (4), generally consisting of two independent sections, with the purpose to distribute the material evenly on the screed unit total width;
- an operator seat (5) for driving the means and for controlling all the machine functions;
- a left side track (6);
- a right side track (7).

Figure 2:
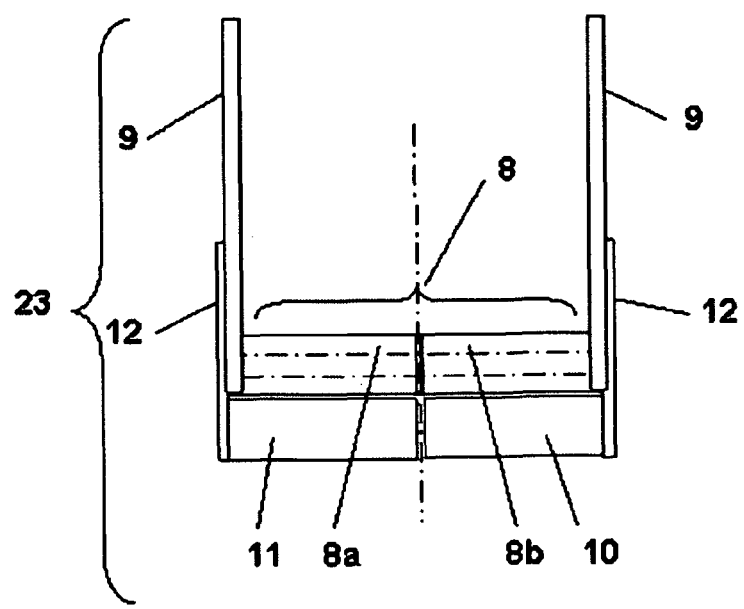
FIG. 2 schematically shows a screed unit according to a plan view.

FIG. 2 schematically shows screed unit (23) according to a plan view and it includes:
- a fixed length central section (8), which can be connected to corresponding towing points (3) of the tractor by means of two towing arms (9). The central section (8) generally consists of two sub-section (8a, 8b) which are centrally hinged to one another to obtain different screed transverse sections;
- in the case of extensible screed unit: one right side section (10) and one left side section (11). The right side (10) and left side (11) sections each have a width equal to about the half of the central section (8) and are generally hydraulically extensible with respect to the central section (8) to obtain variable screed widths;
- in the case of fixed width screed unit only the central section (8) is present;
- two retaining end plates (12).

Possible extension sectors can be applied at the ends of the side sections (10) and (11) to further increase the operating width of the screed.

Other types of screed unit configurations are known which however do not influence in any way the applying of the invention.

Figure 3:
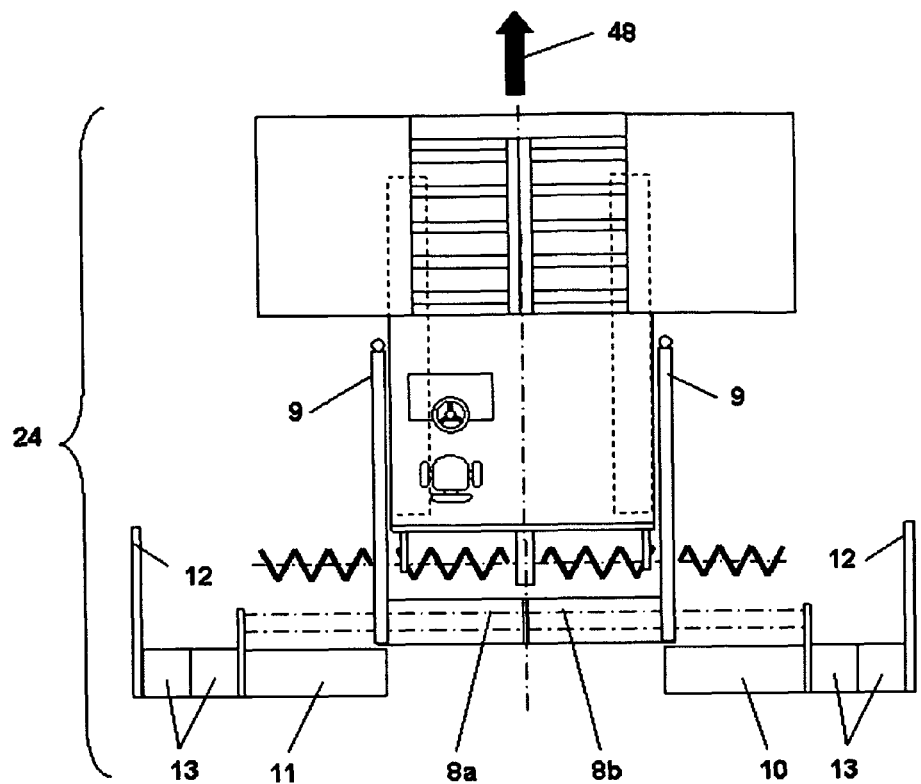
FIG. 3 schematically shows the coupling of the screed unit of FIG. 2 with the tractor of FIG. 1 according to a plan view.

FIG. 3 schematically shows the coupling of the paver finisher (23) of FIG. 2 with the tractor (22) of FIG. 1 according to a plan view and the application of extension sectors (13) has been also represented which have been applied externally and sideways with respect to right side (10) section and left side section (11).

Figure 4:
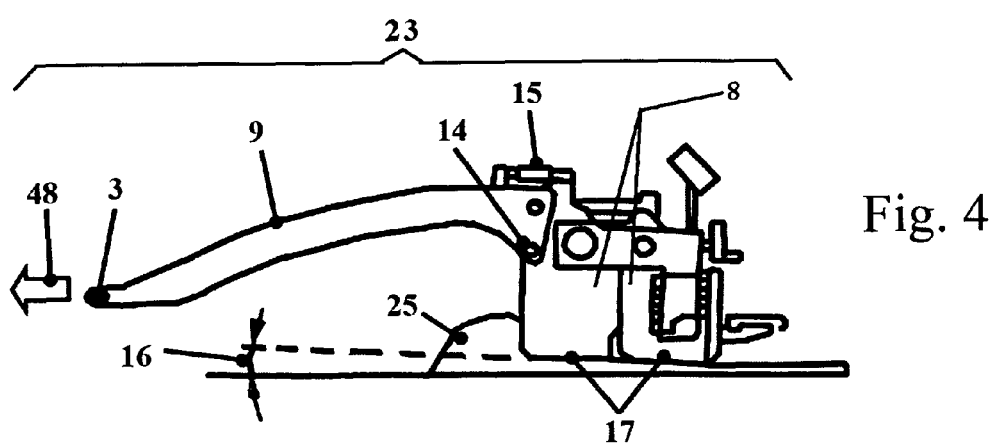
FIG. 4 schematically shows the generic configuration of a screed unit according to a side view.

FIG. 4 schematically shows the generic configuration of a screed unit (23) according to a side view.

The screed unit (23) is connected with the towing arms (9) by a pin (14) and a fixing system (15), able to change the angle (16) between the towing arms (9) and the bottom plate (17) which is located on the bottom of the screed.

According to prior art, the screed is connected (FIGS. 4, 5) by means of articulations only to the tractor's two towing points (3) to have a floating action. Its arrangement is determined (FIG. 6) by the equilibrium of the forces acting on it: towing force T (26), material frictional resistance R (27), material bearing capacity P (28). The arrangement of the screed in equilibrium conditions shows (FIG. 4) an angle (16) of the bottom plate (17) with respect to the laying surface; this angle (16), known as connecting angle, determines the capacity of the screed to mount on the material (25) during the laying phase and pre-compact it.

During the laying phase to avoid the material (25) to overflow outside the screed unit (17) width, appropriate retaining end plates (12) are provided (FIGS. 2, 3). The end plates (12) are used to retain the material distributed by the cochleas in front of the screed and to convey the material toward the machine longitudinal axis when the screed width tightens in case of screed unit with extensible sectors.

Figure 5:
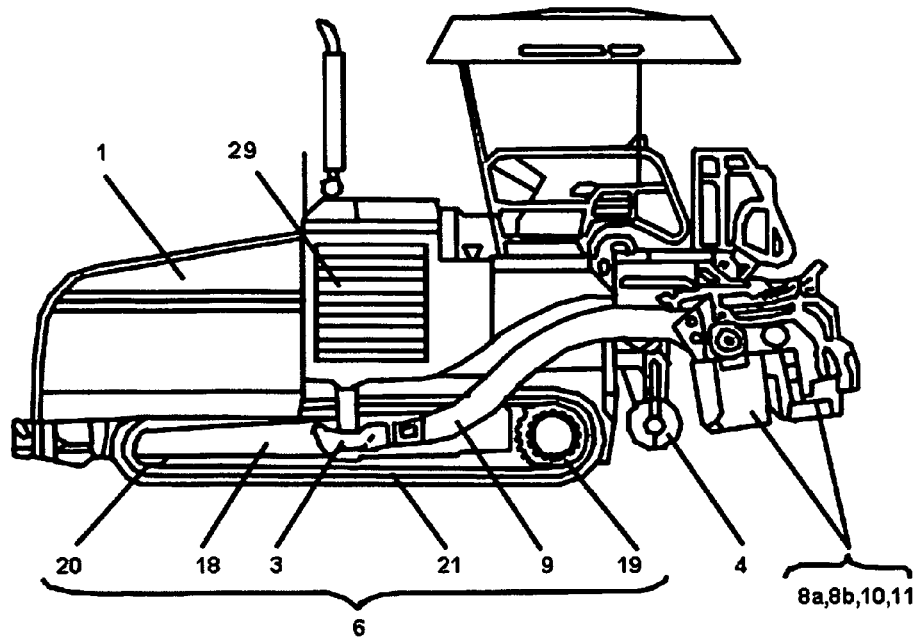
FIG. 5 schematically shows a side-view of the left side of a machine on tracks.

FIG. 5 schematically shows a side-view of the left side of a machine on tracks, wherein for the left side track (6) are schematically represented:
 the supporting frame (18);
 the toothed driving wheel (19);
 the driven wheel (20);
 the chain (21) with (FIG. 8) le shoes (32).

The right side track (7) has a similar configuration.

Figure 6:
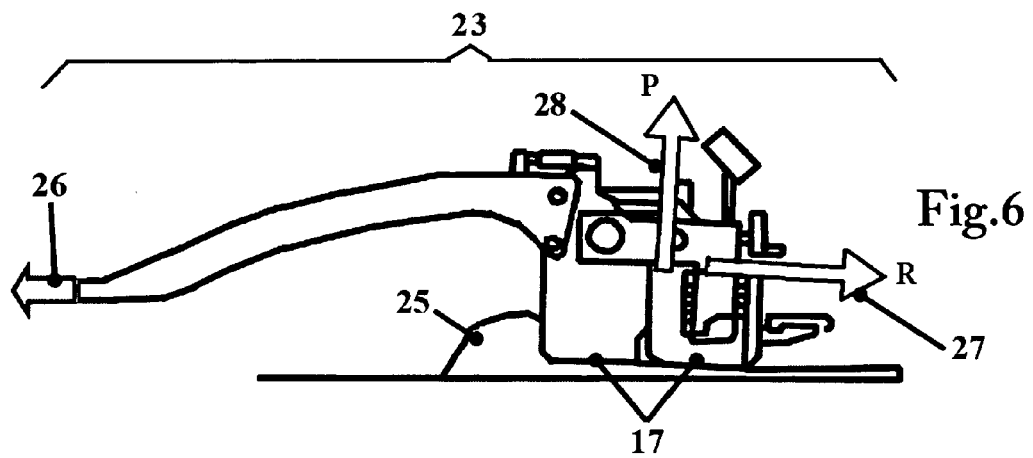
FIG. 6 shows the forces acting on the screed during the working phase.

FIG. 6 shows the forces acting on the screed (23) during the working phase, wherein:
 T (26) schematically represents the towing force;
 P (27) schematically represents the material (25) bearing capacity applied under the bottom plates (17);
  R (28) schematically represents the material (25) frictional resistance applied against the screed sectors (23) e due to friction applied under the bottom plates (17).

Figure 7:
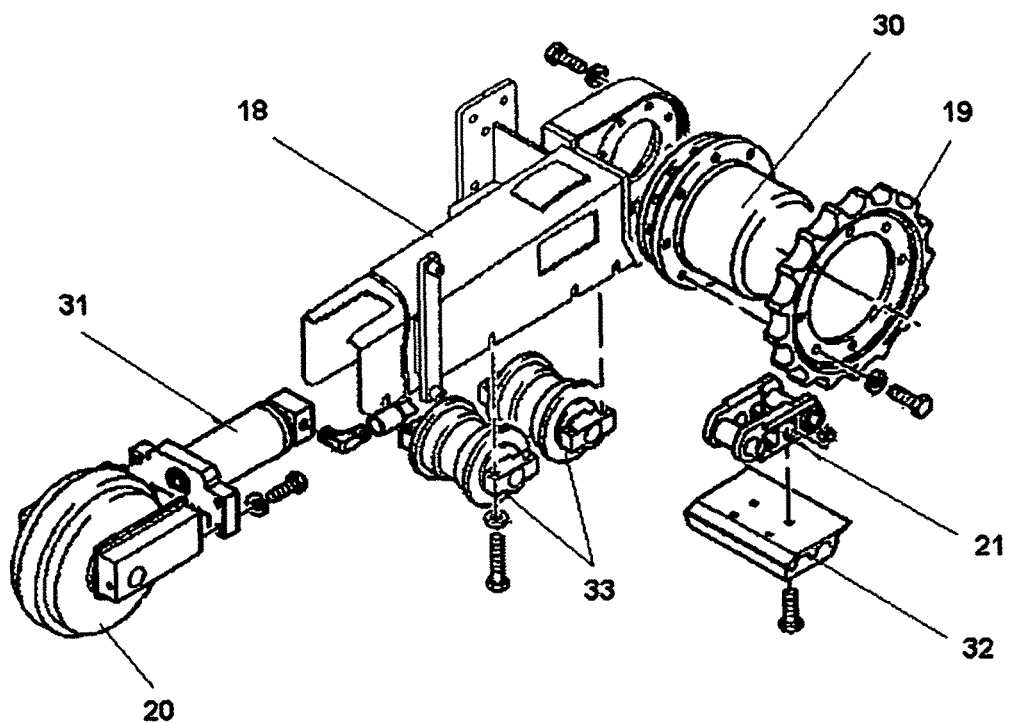
FIG. 7 shows a partial exploded view of the left side track of a machine on tracks.

FIG. 7 shows a partial exploded view of the left side track, wherein are represented:
 the supporting frame (18);
 the driving crown (19);
 the driven wheel (20);
 the chain (21), a single link of which has been represented in order not to make the figure complex;
 planetary gear-reducing device (30), for which the hydraulic motor has not been represented;
 hydraulic cylinder of the tensioning device (31);
 shoes (32) of the track;
 a couple of rolling rolls (33).

Figure 8:
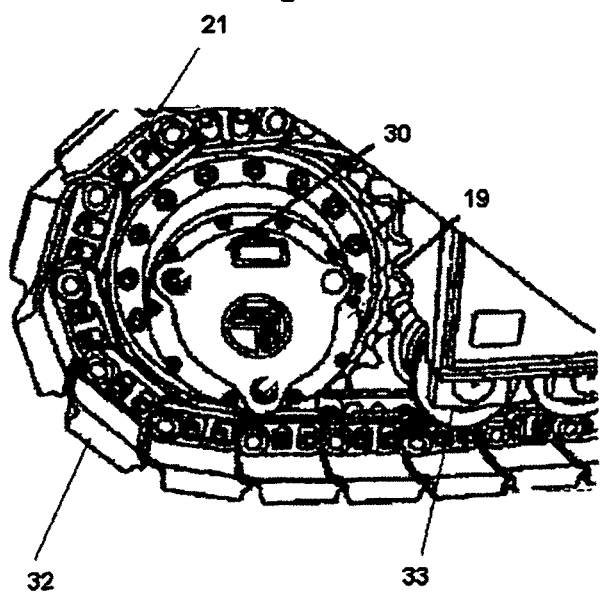
FIG. 8 represents an axonometric view of a portion of the right side track of a machine on tracks.

FIG. 8 represents an axonometric view of a portion of the right side track, wherein the references have the same meaning of the one which are represented in FIG. 7.

Figure 9:
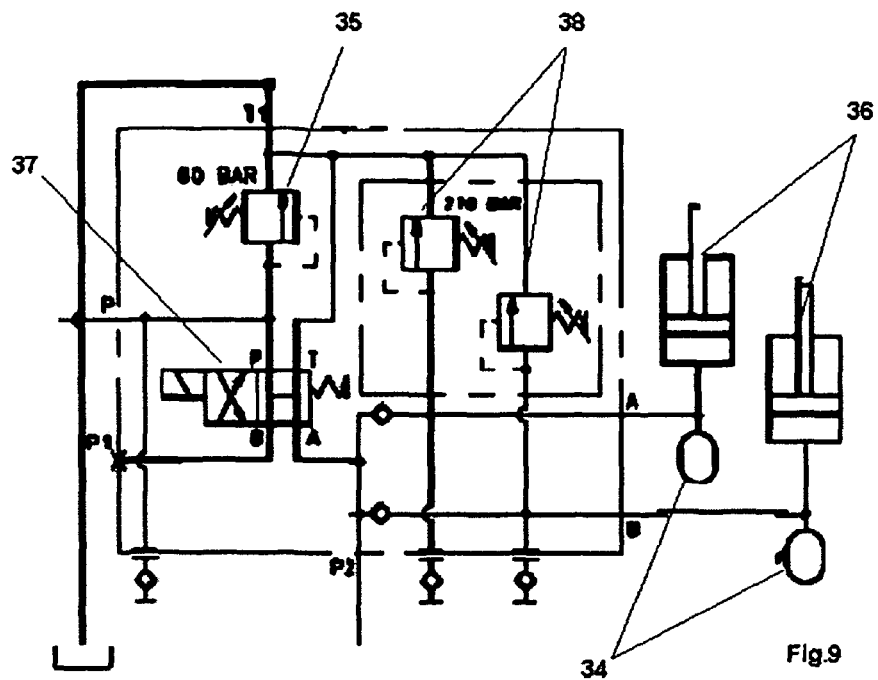
FIG. 9 represents a part of the hydraulic circuit which is typically, but not univocally, used in prior art to control the pressure in the tensioning cylinder.

FIG. 9 represents a part of the hydraulic circuit which is typically, but not univocally, used in prior art to control the pressure in the tensioning cylinder, with a single pressure for the advancement motion and the reverse motion, wherein are represented:
 hydraulic accumulators (34);
 pressure reducing valve (35) of the maximum pressure to the cylinder (e.g. 60 bar);
 tensioning cylinders (36);
 powering electrovalve (37);
 antishock valve (38).

The feeding of the oil is supplied by a open circuit pump, typically a low pressure gear pump type.

Solutions are also used (not represented) providing feeding pressures of the tensioning cylinders which are different for the advancing motion and the reverse motion.

Figure 10:
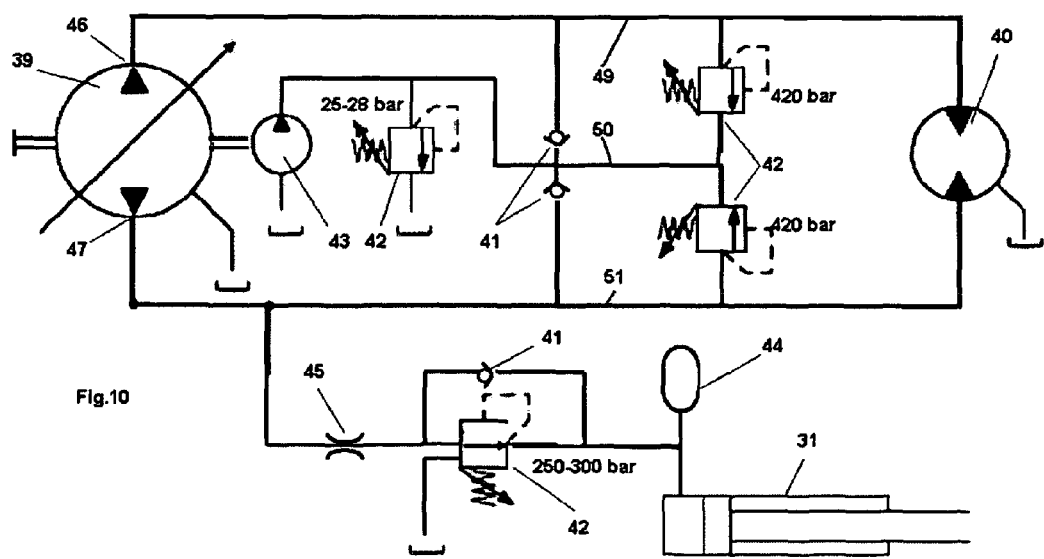
FIG. 10 synthetically shows the hydraulic scheme which is used to control the pressure in the tensioning cylinder according to the invention.

FIG. 10 synthetically shows the hydraulic scheme which is used to control the pressure in the tensioning cylinder according to the invention, wherein are represented:
 cylinder of the tensioning device (31);
 variable-displacement pump (39) to feed the closed circuit of the hydraulic motor to operate a track;
 track operating hydraulic motor (40), which can likewise be of the type with fixed cubic capacity, with double cubic capacity, or with variable cubic capacity;
 non-return valve (41);
 adjustable pressure regulating valve (42);
 boosting pump (43) of the closed circuit;
 hydraulic accumulator (44);
 orifice (45);
 Oil flow direction in the advancing direction (46);
 Oil flow direction in the reverse direction (47).

In the following the machine operation will be described.

During the working phase the machine faces an overall advancement resistance due (FIG. 6):
 to the towing force T (26);
 bearing capacity P (27) of the material (25) applied under the bottom plates (17);
 to the resistance R (28) applied by the material (25) against the sectors of the screed (23) and by friction below the bottom plates (17);
 to the own weight;
 to the weight of the transported material;
 to the frictions of the tracks;
 to the transport means of the material, which are generally pushed by the finisher.

During the transferring phase, in both motion directions namely advancing direction motion and reverse direction motion, the machine faces only the resistances due to its own weight, to the weight of the transported material and to the frictions of the tracks, which are particularly relevant during the change of the motion direction.

The power, which is needed for the machine operation is generally supplied (FIG. 5) by a diesel engine (29) and for the up to date machines, both on tires and on tracks, the traction is obtained with hydraulic engines which are powered by variable range pumps actuated by the diesel engine (29) itself.

For all the operating machines on tracks, the advancing direction in both motion directions is obtained operating on the speed of each track. To steer a track is slowed down and the other one is accelerated, or it can be even be operated with a reverse motion. Such operations occur according to known techniques:
 mechanically with clutches on the transmission of each track solution even if it is now an obsolete technique;
 with hydraulic distributors operating on the hydraulic motor of each track;

with feed-back electronic systems which allow, during the steering phase, to maintain a constant average speed of the machine. This system is particularly efficient if the motor (40) of each track is fed (FIG. 10) with a closed circuit from an own variable range pump (39). Said system is the most used one in the modern tracked finishers and the use of the invention is based on said system.

In the present applications of the tracks, the motion is supplied (FIGS. 5, 7, 8) by a toothed crown (19), which is generally mounted (FIG. 7) on a planetary gear reducing device (30), which is generally operated (FIG. 10) by a hydraulic motor (40) with double cubic capacity, or with variable cubic capacity. This hydraulic motor (40) is generally fed (FIG. 10) with a closed circuit by a variable range reversible pump (39), having an electrical or mechanical control for the variation of the capacity.

On the crown (19) the chain (21) is engaged (FIGS. 5, 7, 8) to which the ground contacting shoes (32) are fixed. The crown (19) transfers to the chain (21) the tangential force due to the torque which is applied by the ratio-motor group consisting of a hydraulic motor (40) and a planetary gear-reducing device (30).

The chain (21) is closed as a ring and it is wound around an un-toothed driven wheel (20), but which is provided on its whole circumference with a rib that precludes the chain to deviate in the transverse direction.

In the usual applications the traction groups formed by crown (19), planetary gear-reducing device (30) and hydraulic motor (40) are mounted in the rear part of the machine and the driven wheels (20) are mounted in the forepart. The planetary gear-reducing device (30) is installed on a supporting frame (18) which is rigidly fixed to the chassis of the machine.

For the transmission of motion the good engagement of the chain (21) on the toothed wheel (19) must be ensured and the derailment of the chain (21) from the driven wheel (20) must also be prevented. This is obtained keeping the chain (21) in a tensioned condition. The tensioning of the chain (21) is obtained applying a force to the driven wheel (20). Such force ha a direction which is an approximately parallel direction with reference to the line connecting the centers of the driving crown (19) and of the driven wheel (20). The intensity of this force is such as to ensure in any operative condition of the machine:
- the optimal engagement of the chain (21) on the crown (19),
- the centering of the chain (21) on the rib of the driven wheel (20).

The tensioning system of the chain (21) is generally obtained mounting the driven wheel (20) on a slide which is longitudinally movable with respect to the line connecting the centers of the driving crown (19) and of the driven wheel (20). On the slide a pushing group acts, which generally consists of a spring which is preloaded by a screw system (not represented), or as an alternative it consists of a spring which is preloaded by a cylinder with pressurized grease (not represented), or as an alternative it consists of a spring which is preloaded by an hydraulic cylinder (not represented), or simply it consists of a hydraulic cylinder (31, 36).

The spring constitutes an essential shock absorber in the case of screw tensioning device or tensioning device with grease cylinder, because it is needed to compensate the variation of distance between axis of the centers of the driving crown (19) and driven wheel (20) caused by the winding of the chain (21), considered as a a polygonal line, on the driven wheel (20). In case of the tensioning device with hydraulic cylinder (31) the intensity of the tensioning force is determined by the pressure of the oil and the shock absorbing function, as an alternative to the spring, can be made by a hydraulic accumulator (34, 44) connected on the feeding of the hydraulic cylinder (31, 36).

With reference to a machine on tracks with the driving crown (19) located on the back, it is evident to those skilled in the art that:
- during the advancing motion the lower section of the chain (21) is tensioned while the upper one is loosen;
- during the reverse motion the lower section of the chain (21) is loosen while the upper one is tensioned.

The tensioning system must ensure in both cases the correct engagement of the chain (21) on the crown (19) and the correct winding of the chain on the driven wheel (20), whatever is the strain of the tracks during the traction phase.

Referring to FIG. 10 it results that the cylinder (31) of the tensioning device uses the closed circuit of the traction for its operation.

In detail:
- during the advancing motion the feeding pressure is the one supplied by the boosting pump (43) of the closed circuit, generally of about 25-28 bar. The section of the cylinder (31) of the tensioning device must be sized for providing the sufficient force to put in tension the chain (21) in an effective way with oil supplied with the aforementioned pressure;
- during the reverse motion the feeding pressure is the sum of the one supplied by the pump (39) with variable range of the closed circuit (indicatively 400 bar) and by the boosting pump (43). The feeding pressure is opportunely reduced by a relief valve (42) indicatively to about 250-300 bar. Until the operational conditions of the machine do not require a pressure in the traction circuit which is higher than the setting pressure of the relief valve (42), the cylinder (31) of the tensioning device is fed with the same variable pressure of the traction circuit.

Therefore two objective are advantageously achieved:
- during the advancing motion the tensioning of the track occurs with the force which is closely needed for the various working conditions, limiting the power withdrawing from the diesel engine;
- during the reverse motion the tensioning of the track occurs with a force which is higher than the previous one and with a power withdrawing which is proportional to the effort of the traction within a wide range of operation.

The hydraulic accumulator (44), which is recommended but not closely necessary, levels the pressure changes which are transmitted to the feeding circuit from the movement of the shaft of the cylinder (31), said movement being mainly caused by the winding of the chain (21) on the driven wheel (20).

Also the orifice (45) itself performs an amortizing action and it prevents the oil from suddenly exiting in the case a pipe breaks at a downstream location.

Therefore, synthetically, the present invention relates to a tensioning system of traction tracks (21, 32) of a machinery by means of a hydraulic cylinder (31) applying a tensioning force on at least one of the wheels on which the track (21, 32) is wound according to a closed chain configuration, in which said hydraulic cylinder (31) is fed with different pressures according to the traction direction:
- in a first traction direction the feeding pressure of the tensioning hydraulic cylinder (31) being a first pressure approximately corresponding to the pressure which is generated by the boosting pump (43) of the closed circuit feeding the traction device;

in a second traction direction the feeding pressure of the tensioning hydraulic cylinder (31) being a second pressure approximately corresponding to the pressure of the closed circuit until it reaches a predefined limiting value.

The first pressure is always lower than the second pressure.

The first pressure is usually in the range 25 bar to 28 bar, which are characteristic values of the closed circuit hydraulic transmissions.

The second pressure is in the range 25-28 bar to 450 bar, which are characteristic pressures of the high pressure closed circuit hydraulic transmissions.

In the preferred embodiment of the present invention the feeding pressure of the tensioning hydraulic cylinder (31) which is obtained from the second pressure is limited to a maximum pressure value by means of a pressure relief valve (42) which is present at an upstream position with reference to the tensioning hydraulic cylinder (31).

The pressure relief valve (42) limits the feeding pressure of the hydraulic cylinder (31) to a pressure between 150 bars and 350 bars, preferably to a pressure between 200 bars and 325 bars, even more preferably to a pressure between 250 bars and 300 bars.

In the preferred embodiment of the present invention the tensioning system includes at least one hydraulic accumulator (44) at an upstream position with respect to the tensioning hydraulic cylinder (31), the hydraulic accumulator (44) flattening the pressure variations which are transmitted to the feeding circuit by the movement of the shaft of the tensioning hydraulic cylinder (31).

In the preferred embodiment of the present invention the tensioning system further includes at least one orifice valve (45) at an upstream position with respect to the tensioning hydraulic cylinder (31), the orifice (45) exercising an absorbing action and preventing the oil from suddenly exiting in the case a pipe breaks at a downstream location.

In one embodiment the hydraulic cylinder (31) intended for tensioning the track (21, 32) applies the tensioning force on the wheel on which the track (21, 32) is wound according to a closed chain configuration, and the wheels on which the track (21, 32) is wound are a couple of wheels, a first wheel of which being a driving wheel (19) consisting of a toothed crown and a second wheel being an un-toothed driven wheel (20) which is provided on its whole circumference with a transverse retaining rib retaining said chain. In the preferred embodiment of the present invention a single driving wheel (19) and a single driven wheel (20) are present for each track, possibly with one or more rolling rolls (33). In the preferred embodiment of the present invention the hydraulic cylinder (31) tensioning the track (21, 32) applies the tensioning force on the driven wheel (20).

Preferably the first traction direction is the forward running motion corresponding to the advancing direction of the machinery and the second traction direction is the reverse motion corresponding to the backward direction of the machinery.

The closed circuit feeding the traction devices is composed by a first branch (49), a second branch (51) and an intermediate branch (50), a variable displacement pump (39) being connected between the first branch (49) and the second branch (51). The variable displacement pump (39) is configured and structured to address the oil flow at high pressure alternatively towards a first flow direction (46) towards the first branch (49) or towards a second flow direction (47) towards the second branch (51) depending on a control sent to the variable displacement pump (39). A boosting pump (43) is connected in correspondence of the intermediate branch (50), being configured and structured to address the flow into this intermediate branch (50). The intermediate branch (50) is connected to the first branch (49) by means of a non-return valve (41) directed towards this first branch (49) and a pressure regulating valve (42). The intermediate branch (50) is connected to the second branch (51) by means of a non-return valve (41) directed towards this second branch (51) and a pressure regulating valve (42). The non-return valves (41) being arranged to address the flow of the boosting oil towards the branch (49), or (51) which at that moment has a lower pressure than the pressure supplied by the boosting pump (43). A traction hydraulic motor (40) is connected between the first branch (49) and the branch (51), and the hydraulic motor (40) operates the driving wheel (19). The hydraulic cylinder (31) is connected to the second branch (51) of the closed circuit of the traction. In the first traction direction the feeding pressure of the hydraulic cylinder (31) is the one which is supplied by the boosting pump (43). In the second traction direction the feeding pressure of the hydraulic cylinder (31) is given by the sum of the one supplied by the variable displacement pump (39) and from the boosting pump (43), said pressure being opportunely limited to a predefined maximum value by adjusting the relief valve (42). The section of the hydraulic cylinder (31) will be sized in order to provide a sufficient tensioning force of the chain (21) in an effective way in correspondence with this first pressure.

Preferably the machinery including said tensioning system of traction tracks (21, 32) is a paver finisher.

The description of the present invention has been made with reference to enclosed figures in a preferred form of execution of the same, but it is evident that many possible alterations, changes and variants will be immediately clear to those skilled in the art of the sector in view of the previous description. So, it should be stressed that the invention is not limited by the previous description, but contains all alterations, changes and variants in accordance with the appended claims.

The invention claimed is:

1. A tensioning, system for a traction track of a machinery comprising: a hydraulic cylinder applying a tensioning force on at least one wheel on which said track is wound according to a closed chain configuration wherein said hydraulic cylinder is fed with different pressures according to the traction direction:

in a first traction direction said feeding pressure of said tensioning hydraulic cylinder being a first pressure approximately corresponding to the pressure which is generated by a boosting pump of a closed circuit feeding the traction devices;

in a second traction direction said feeding pressure of said tensioning hydraulic cylinder being a second pressure approximately corresponding to the pressure of said closed circuit.

2. The tensioning system for a traction tracks of a machinery according to claim 1 wherein said first pressure is lower than said second pressure.

3. The tensioning system for a traction tracks according to claim 1 wherein the feeding pressure of said tensioning hydraulic cylinder which is obtained from said second pressure is limited to a maximum pressure value by a pressure relief valve which is present at an upstream position with reference to said tensioning hydraulic cylinder.

4. The tensioning system according to claim 3 wherein said pressure relief valve limits said feeding pressure of said hydraulic cylinder to a pressure between 150 bars and 350 bars.

5. The tensioning system of claim 4 wherein said feeding pressure is between 200 and 325 bars.

6. The tensioning system of claim 5 wherein said feeding pressure is between 250 and 300 bars.

7. The tensioning system according to claim 1 further comprising: at least one hydraulic accumulator at an upstream position with respect to said tensioning hydraulic cylinder, said hydraulic accumulator flattening the pressure variations which are transmitted to the feeding circuit by the movement of the shaft of said tensioning hydraulic cylinder.

8. The tensioning system claim 1 further comprising: at least one orifice valve at an upstream position with respect to said tensioning hydraulic cylinder, said orifice exercising an absorbing action and preventing an oil from suddenly exiting in the case a pipe breaks at a downstream location.

9. The tensioning system claim 1 wherein said hydraulic cylinder applies said tensioning force on one of the wheels on which said track is wound according to a closed chain configuration, said wheels on which said track is wound according to a closed chain configuration being a couple of traction wheels, a first wheel of which being a driving-wheel comprising of a toothed-crown wheel and a second wheel being an un-toothed driven wheel which is provided on its whole circumference with a transverse retaining rib retaining said chain.

10. The tensioning system according to claim 9 wherein said hydraulic cylinder tensioning said track applies said tensioning force on a drive wheel.

11. The tensioning system according to claim 1 wherein said first traction direction is the forward running motion corresponding to the advancing direction of said machinery and said second traction direction is the reverse motion corresponding to the backward direction of said machinery.

12. The tensioning system according to claim 11 wherein a section of said hydraulic cylinder is sized for providing a sufficient tension force of said chain in an effective way in correspondence with said first pressure.

13. A machinery on traction tracks wherein at least one of the traction tracks of the machinery includes a tensioning system of traction tracks according to claim 1.

14. The tensioning system of claim 1 wherein said closed circuit further comprises a pump which feeds the closed circuit to generate said first pressure and said boosting pump when activated increases a pressure of said closed circuit to said second pressure.

15. The tensioning system of claim 1 wherein said closed circuit further comprises a hydraulic motor which operates the track and is fed by the pump.

16. The tensioning system of claim 1 wherein said closed circuit further comprises a pump which feeds a hydraulic motor to operate the track.

\* \* \* \* \*